Jan. 10, 1933.  L. J. BLACK  1,893,485
QUICK DETACHABLE PITMAN
Filed March 29, 1930  2 Sheets-Sheet 1
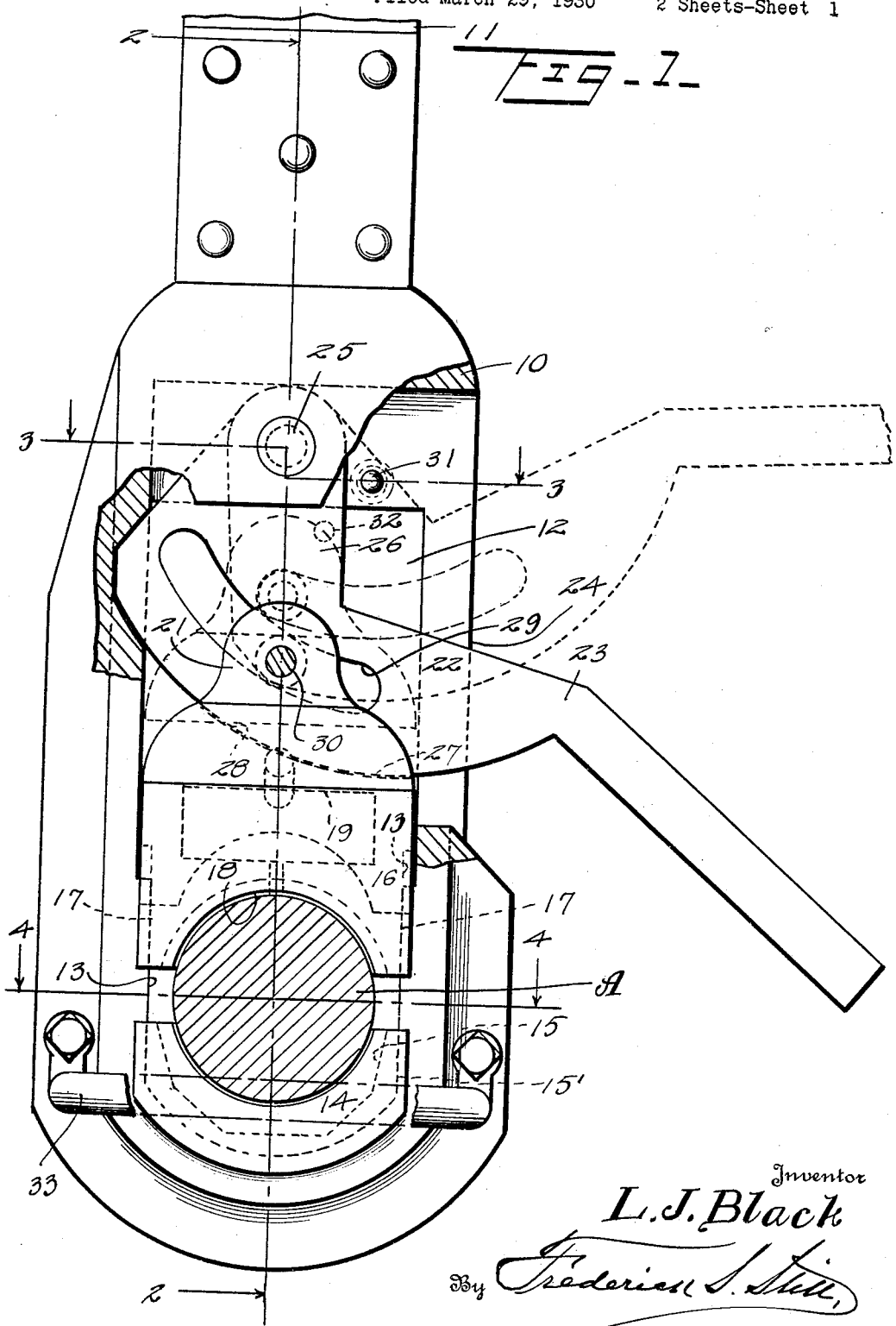
Inventor
L. J. Black
By Frederick S. Still,
Attorney Jan. 10, 1933.  L. J. BLACK  1,893,485
QUICK DETACHABLE PITMAN
Filed March 29, 1930   2 Sheets-Sheet 2
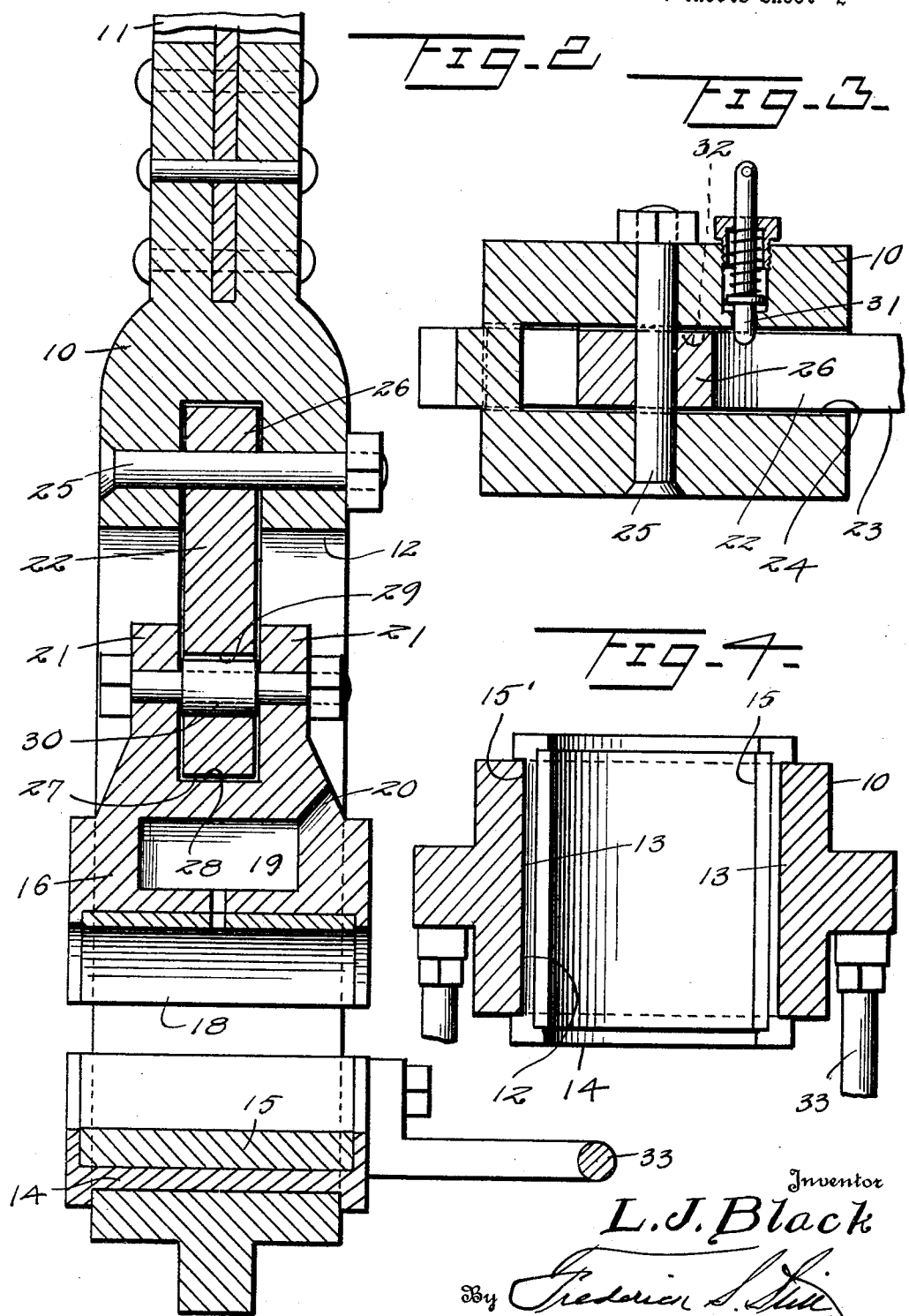

Patented Jan. 10, 1933

1,893,485

UNITED STATES PATENT OFFICE

LEE J. BLACK, OF BEAUMONT, TEXAS

QUICK DETACHABLE PITMAN

Application filed March 29, 1930. Serial No. 440,058.

This invention relates to pitmen used in drilling and pumping oil wells and particularly to the bearing of such a pitman which is designed to engage the wrist pin of a crank and which must be, in the practical operation of oil well drilling, capable of being readily detached from the crank while the crank is in motion.

One of the objects of the present invention is to provide a construction of this character which is relatively simple, which will automatically take up wear on the pitman bearings for the wrist pin and which, as above stated, may be readily taken down or detached from the wrist pin while the crank carrying the wrist pin is in motion.

A further object is to provide a pitman which includes a yoke member within which upper and lower bearings for the wrist pin are disposed, this yoke member being so formed as to permit the ready insertion or removal of the upper and lower wrist pin bearings while at the same time holding these bearings from any lateral motion with relation to the pitman, the bearings when in place, being locked against any such lateral motion.

A further object is to provide a construction of this character wherein the upper bearing may be readily lifted or shifted upward away from the lower bearing by a lever, and locked in this raised position if desired, the lever acting through its weight and through a camming action exerted upon the upper bearing to yieldingly force the upper bearing downward toward the lower bearing and against the crank or wrist pin.

A still further object is to provide a construction of this character wherein the lever is mounted for swinging movement and is provided with a slot slightly eccentric to the center of motion of the lever, this slot being engaged with the upper bearing by a pin so that the weight of the lever will swing the lever downward and this by the action of the eccentric slot will force the upper bearing down against the wrist pin and another object in this connection is to so dispose the pivot for said lever that it shall be immediately above the pin which enters the cam slot so that any upward thrust exerted upon the upper bearing will be resisted by the fact that the pin on this upper bearing is at all times in vertical alinement with the pivot pin of the lever, thus to all intents and purposes locking the pin from upward movement, the construction being such, however, as to permit the bearing to urge the pin and the upper bearing downward, thus taking up wear.

Other objects will appear in the course of the following description.

My invention is illustrated in the accompanying drawings, wherein:—

Figure 1 is a front elevation partly in section of the lower portion of a pitman constructed in accordance with my invention.

Figure 2 is a section on the line 2—2 of Figure 1.

Figure 3 is a section on the line 3—3 of Figure 1.

Figure 4 is a section on the line 4—4 of Figure 1.

Referring to these drawings, 10 designates a yoke preferably of cast steel and bolted at its upper end to the extension 11 to the stirrup top of the pitman. The particular manner of connecting the yoke to this pitman is relatively immaterial. The yoke, as will be seen from Figure 1, is formed with an opening 12 which extends through the yoke and is, generally speaking, rectangular in form. The opposite side walls at the lower portion of this opening are inwardly extended as at 13 so that this opening 12 is narrower at the lower end of the opening than it is at the upper end of the opening. The lower wall of the opening is rounded and disposed within the lower end of the opening 12 is a lower bearing box 14 carrying the bronze bearing 15. This lower bearing member 14 is formed upon its lateral edges and upon its bottom edge with a groove or channel 15' which embraces the opposed walls 13 when the bearing box is in place. The bearing box has a total width slightly less than the width of the top of the opening 12 so that the bearing box may be inserted into this opening, then lowered and the channel 15' will engage the wall 13 so that the wall on each side of the channel 15' will engage over the wall 13 or in other words, the side edges and bottom of the bearing box 14 may be considered to have spaced flanges engaging on each side of the wall 13 when the bearing box 14 is lowered.

Disposed above the bearing box 14 is a bearing box 16 which is likewise formed with a channel 17 in its side edges adapted to embrace the wall 13 in the same manner as the bearing box 14 but when this bearing box 16 is raised up to its full extent, the channel will escape from its engagement with the wall 13 and the bearing box may be readily removed or inserted. This bearing box is also provided with the Babbitt metal 18 which confronts the bronze bearing 15, these two opposed surfaces being so formed as to engage against and constitute a bearing for the wrist pin of the usual pitman operating crank.

The bearing box 16 is formed above the Babbitt metal 18 with an oil reservoir 19 having an aperture discharging through the Babbitt metal and on to the wrist pin, this oil reservoir 19 being adapted to be filled with oil and waste and having a filling passage 20.

Above the oil reservoir, the bearing box 16 is upwardly extended in the form of two spaced ears 21 and operating between these ears is a lever 22 having the handle 23 extending out through a slot 24 formed in the side wall of the yoke 10. This lever is pivoted upon a pivot pin 25 extending through the upper end of the lever and having its axis disposed on a medial plane with the pitman. The lever at its upper end is formed with a head 26 through the upper end of which the bolt 25 passes, this head having a curved lower face 27 bearing against the curved face 28 of the material between the ears 21. This head 26 is also formed with a curved slot 29 and a sleeved bolt 30 passes through the ears 21 and through this slot.

Hence it will be seen that as the lever is raised, the upper bearing box 16 will be raised and as the lever is lowered, the upper bearing box 16 will be lowered. It will further be seen that the weight of the lever with its handle 23, acts to urge the upper bearing box downward toward the lower bearing box and into proper bearing engagement with the wrist pin.

It will be, of course, noted from the drawings that the pivot bolt 25 for the lever is located directly above and at all times in alinement with the bolt 30 which passes through the cam slot 29. As a consequence of this, any upward thrust exerted against the upper bearing box 16 will not act to lift the bearing box as this lifting motion will be resisted by the upper wall of the cam slot 29 and this thrust will be transmitted directly upward to the pivot pin 25. If the pivot pin 25 and the bolt 30 were not disposed in vertical alinement any upward thrust exerted upon the upper bearing would tend to lift the lever 22, but with my construction this is impossible for the reason that the effective angle of the contacting surfaces of the lever head and the upper bearing member is less than the angle of friction of these two members, yet at the same time the lever 22 because of the lateral prolongation of the handle 23 will constantly tend to swing downward and will exert a camming action upon the bottom of the recess between the ears 21 and upon the pin 30 so that the upper bearing member will be urged constantly downward into proper bearing engagement with the wrist pin. In the construction illustrated the radius for the under face of the cam-shaped head of the lever and the radius for the cam slot 29 is disposed at an angle of about thirty degrees to the vertical axis which passes through the pins 30 and 25. Thus the weight of the lever 22 with its arm 23 will tend to constantly urge the upper bearing member 16 downward.

If the pin 25 be disposed slightly off of the center line of the yoke, that is, to one side of the center line of the yoke in a direction away from the arm 23, the resistance against upward movement of the bearing 16 will not be positive but there will still be considerable resistance to this upward movement. The further away the pin 25 is from this central line, the less this resistance, but in either case, the curvature of the slot 29 is eccentric to the bolt 25 so that the head of the lever 22 will exert a camming action upon the upper bearing urging this upper bearing downward.

With this construction, any wear that might occur will be gradually taken up, thus keeping the bearing snug on the wrist pin. Preferably, means will be provided for locking the lever in its raised position and to this end, the yoke 10 may be provided with the spring actuated locking pin 31 which extends through one wall of the yoke and has a rounded inner end, the lever being provided with a socket 32 engageable with this pin when the lever is lifted. Thus the lever may be detachably latched in its raised position but may be readily detached from this latch bolt 31 either by retracting the latch bolt by means of its projecting shank or by forcing the lever downward and causing it to force the rounded end of the latching pin rearward.

The Babbitt metal collar 18 is cast into and forms part of the upper bearing member 16 and, therefore, will move up and down as this carrying box is moved. The lower bronze bearing 15 fits into the bearing 14 and is intended to take the wear on the wrist pin and the crank arm. The crank arm is not shown, but the wrist pin of the crank arm is designated A in the drawings.

One of the particular objects of this invention is to provide a pitman which can be taken down while the rig is in operation in case of emergency, and in order to take it down, the lever 22 is thrown to the up position where the pawl or latch 31 catches it. This raises the bearing 16 and locks it in the up position for removing or taking down the pitman. This movement has an extent of only about one inch in actual practice. When the pitman is to be replaced on the wrist pin, the pitman is raised up, shoved over the end of the wrist pin, and the lever 22 is pulled downward. This forces the bearing 16 down on top of the pin and the weight of the bearing, the weight of the lever and the action of the coacting cam faces, as explained, will gradually take up any wear that might occur in the bronze bearing 18, keeping the bearing snug on the wrist pin. It will be seen that as the bearing wears, the lever will move gradually downward, wedging the upper bearing member downward, but preventing any reverse movement of the bearing.

One of the particular advantages of this construction is that this pitman can be taken down while the rig is in operation in case of any emergency such as the sticking of the tools when it is necessary to hoist them from the bottom of the hole quickly. When the tug ropes are kicked on to the wheels that wind up the drilling lines, and the temper screw is unclamped from the drilling cable, the tool dresser can seize the handle 33 and throw the lever 22 to its up position which will open the bearing and he can then pull upon the handle 33, which is attached to the lower end of the yoke, and pull the pitman bearing off of the pin while the crank is in motion.

Another advantage attained by my device is the automatic tightening feature whereby a constant take-up is provided for the upper bearing against the wrist pin. Still another advantage of this construction is due to the fact that the upper and lower bearings with their channels or flanges can be passed through the upper portion of the opening 12 and then lowered into position and when so lowered, there can be no side motion or side play of these upper and lower bearings or any chance for the bearing members to shift in or out of the yoke, nor is it a necessity with this construction to use any bolts or screws for holding these bearings in place as in ordinary practice, bolts, screws and the like are very liable to become loose and cause trouble in operation. This I regard as a particularly valuable feature of my construction.

In actual practice there is very little wear on the upper bearing as the load in operation is entirely carried by the lower bearing and in no construction known to me is provision made for automatically taking up this wear. My quadrant arrangement, the hinge pin on the center line and quadrant struck from approximately thirty degrees on the side, will give a constant downward pressure from the weight of the lever that will secure a snug fit on the pin and compensate for any wear. It will be seen that I have provided a means for retaining the upper and lower bearings within the yoke which positively prevents the bearings from becoming disengaged and which has no loose parts in operation, that I further provide a quadrant arrangement that will positively lock the bearings when in a down position against upward movement, and at the same time, by the operation of a single lever, without any tools, other than the lever, will open the bearing to a take down position.

It will further be seen that this quadrant arrangement will constantly take up any wear that might occur on the upper bearing which is subject to any load by forcing the crank pin down against this bottom bearing as it wears.

While I have illustrated a specific form of my invention, I do not wish to be limited to the exact form as it is obvious that it might be modified in minor ways without departing from the principle of the invention as defined in the appended claims.

I claim:—

1. In a pitman, a yoke having a vertical approximately rectangular opening, upper and lower bearing boxes disposed within the opening in said yoke, the upper bearing box being slidable vertically within the yoke, and having spaced ears, a lever having a head pivoted to the yoke, the lower margin of said head being disposed between said ears, the lever being pivoted to the yoke on a line intersecting the middle of the upper bearing box and said ears having a lower convexly curved face whose center of curvature is disposed laterally of the pivotal center of the lever and toward the free end of the lever whereby the handle of the lever under the action of gravity will cause the lever to swing in a direction to carry the handle of the lever inward toward the pitman, the upper end of the bearing box between said ears having a curved face against which the curved under face of the lever engages, the curvature of this under face being the same radius as the curvature of the under face of the lever.

2. In a pitman, a yoke having a vertical approximately rectangular opening, upper and lower bearing boxes disposed within the opening in said yoke, the upper bearing box being slidable vertically within the yoke, and having spaced ears, a lever having a handle and having a head pivoted to the yoke on a line extending longitudinally through the middle of the upper bearing box, the lower margin of said head being disposed between said ears, the lever having a lower convexly curved face, whose center of curvature is disposed laterally of the pivotal center of the lever and toward the free end of the handle whereby the handle of the lever under the action of gravity will cause the lever to swing in a direction to carry the handle of the lever inward toward the pitman, the upper end of the bearing box between said ears having a curved face against which the curved under face of the lever engages, the curvature of this under face having the same radius as the curvature of the under face of the lever, the head of the lever having a slot concentric to the curvature of the lower face of the lever, and the ears having a pin engaging through said slot and intersected by a line which intersects the pivotal center of the lever.

3. In a pitman, a yoke, a lower bearing box, an upper bearing box, and a lever pivoted on the yoke and projecting laterally beyond the same, the under face of the lever being curved and having operative engagement against the upper bearing box, the weight of the lever acting to urge the upper bearing box toward the lower bearing box entirely under the action of gravity, the curved contacting faces of the lever and bearing box extending upward and laterally away from the handle of the lever, and being eccentric to the pivotal center of the lever, and concentric to a point to one side of the pivotal center of the lever and between the pivotal center of the lever and the free end of the handle.

4. In a pitman, a yoke, a lower bearing box, an upper bearing box, and a lever pivoted on the yoke and projecting laterally beyond the same, the under face of the lever being curved and having operative engagement against the upper bearing box, the weight of the lever acting to urge the upper bearing box toward the lower bearing box entirely under the action of gravity, the contacting faces of the lever and bearing box extending upward and laterally away from the handle of the lever concentrically to a point to one side of the pivotal center of the lever and between the pivotal center and the handle and said contacting faces being eccentric to the pivotal center of the lever, and means on the yoke for detachably holding the lever in a raised position.

5. In a pitman, a yoke having a vertical approximately rectangular opening, upper and lower bearing boxes disposed within the opening in said yoke, the upper bearing box being slidable vertically within the yoke, and having spaced ears, a one-piece operating lever having a head and a handle, said head being pivoted to the yoke on a line extending vertically upward through the middle of the upper bearing box, the lower margin of said head being disposed between said ears, the lever having a lower convexly curved face, the upper bearing box having a corresponding upper concave face, the center of curvature for said faces being disposed laterally of the center of movement of the lever and between said center of movement of the lever and the free end of the handle whereby the handle and the lever under the action of gravity causes, through friction between the mating curved surfaces, a rotating action causing the lever to swing in a direction to carry the handle of the lever inward toward the pitman and constantly urge the upper bearing box downward, the head of the lever having a slot concentric to the curvature of the lower face of the lever, and a pin passing through said ears and engaging said slot.

In testimony whereof I affix my signature.

LEE J. BLACK.